(12) United States Patent
Murakami

(10) Patent No.: US 9,286,174 B2
(45) Date of Patent: Mar. 15, 2016

(54) DISK ARRAY HAVING MIRROR CONFIGURATION AND REBUILDING METHOD THEREFOR

(71) Applicant: International Business Machines Corporation, Armonk, NY (US)

(72) Inventor: Yoshikuni Murakami, Zama (JP)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 14/062,037

(22) Filed: Oct. 24, 2013

(65) Prior Publication Data

US 2014/0136887 A1 May 15, 2014

(30) Foreign Application Priority Data

Nov. 9, 2012 (JP) ................................. 2012-247921

(51) Int. Cl.
*G06F 11/00* (2006.01)
*G06F 11/20* (2006.01)
*G06F 11/16* (2006.01)
*G06F 11/07* (2006.01)

(52) U.S. Cl.
CPC ........ *G06F 11/2082* (2013.01); *G06F 11/0727* (2013.01); *G06F 11/1612* (2013.01); *G06F 11/2053* (2013.01)

(58) Field of Classification Search
CPC ............ G06F 11/2082; G06F 11/2094; G06F 11/0727; G06F 11/1612; G06F 11/2053; G06F 11/2056; G06F 11/2069

USPC ............ 714/6.23, 6.1, 6.2, 6.22, 6.3, 6.32, 42
See application file for complete search history.

(56) References Cited

U.S. PATENT DOCUMENTS

| | | | |
|---|---|---|---|
| 7,089,448 B2 * | 8/2006 | Hinshaw et al. .............. 714/6.12 |
| 7,631,218 B2 | 12/2009 | Daikokuya et al. | |
| 2005/0097390 A1 * | 5/2005 | Tanaka et al. ..................... 714/5 |
| 2005/0102552 A1 * | 5/2005 | Horn ................................. 714/6 |
| 2007/0101187 A1 * | 5/2007 | Daikokuya et al. ............... 714/6 |
| 2013/0097375 A1 | 4/2013 | Iida | |

FOREIGN PATENT DOCUMENTS

| JP | 92007094994 | 4/2007 |
|---|---|---|
| JP | 2012014638 | 1/2012 |

* cited by examiner

*Primary Examiner* — Joseph D Manoskey
(74) *Attorney, Agent, or Firm* — Cantor Colburn LLP; Randall Bluestone

(57) ABSTRACT

One aspect includes a disk array having a mirror configuration to rebuild. The disk array includes a buffer to temporarily store data (data X) in a read or write request from a host (read/write request), a redundant first disk and second disk having a mirror configuration, and an auxiliary disk. A redundancy management table logs disk locations of data stored in the first disk and copied to the auxiliary disk. A controller controls reading and writing of data X between the buffer and two redundant disks in response to a request. The controller is configured to: (a) copy to the auxiliary disk, data X stored in the buffer for rebuilding, in parallel with reading and writing data X, when the second disk fails; (b) log, in the redundancy management table, copied disk locations of data X copied in (a); and (c) return a response to the host after copying completion.

15 Claims, 6 Drawing Sheets

FIG. 2

Redundancy Management Table
(Non-Volatile Storage Area in Disk Array)

| LBA Block (Address Block) | Cumulative Data Size | Copied? |
|---|---|---|
| 0000 - 1000  Z | 2M | |
| 1000 - 2000  X | 4M | |
| 2000 - 3000  Y | 6M | |
| 3000 - 4000 | 8M | OK |
| 4000 - 5000 | | OK |
| ⋮ | ⋮ | ⋮ |
| 80000000 | 1T | |

Notes • 1LBA: indicates 1sector (512B)
• Read/Write using address blocks (1000 LBA units)

Add data (Y, Z) when the size of the access data (X) from the host is smaller than a first predetermined value (ex. 4 MB).

(a) Size of data X ≥ threshold value (ex. 2 MB): Subsequent access assumed to be sequential
• Added data → Subsequent data Y (b) Size of data X < threshold value (ex. 2 MB): Subsequent access assumed to be random
• Added data → Subsequent data Y and previous data Z

DISK ARRAY HAVING MIRROR CONFIGURATION AND REBUILDING METHOD THEREFOR

PRIORITY

The present application claims priority to Japanese Application No. 2012-247921 filed on Nov. 9, 2012, and all the benefits accruing therefrom under 35 U.S.C. § 119, the contents of which are incorporated by reference in its entirety herein.

FIELD OF THE INVENTION

Embodiments relate to a disk array having a mirror configuration, which is rebuilt in parallel with input/output (IO) access from a host, and to a rebuilding method for this disk array.

BACKGROUND

A host reads and writes data to disk arrays with a mirror configuration (RAID1, RAID10: redundant arrays of inexpensive disks) that are connected to a fiber channel (FC) or Ethernet. RAID 1 simultaneously writes exactly the same data to two devices. RAID 10 includes RAID 1 as a constituent element.

In the prior art, RAID1 is given priority in IO access from the host, such as host reading and writing operations. When IO access operations from the host are frequent, it can take a long time to completely rebuild another disk when a disk failure occurs. During this period, the disk array remains in a non-redundant state. Rebuilding refers to the task of rebuilding and copying data from the remaining disk and replacing a failed disk with a new one, which is a hard disk with an RAID configuration.

Japanese patent application publication JP2007094994 discloses a rebuilding method which changes the scale of the rebuilding process whether or not there is IO access from a host. In Japanese patent application publication JP2012014638, the ratio between host IO processing and rebuilding is simply set to achieve a balance between normal IO operations and the rebuilding process.

SUMMARY

Embodiments provide a disk array having a mirror configuration to rebuild. The disk array includes a buffer to temporarily store data (data X) in a read or write request from a host (read/write request), a redundant first disk and second disk having a mirror configuration, and an auxiliary disk used to perform rebuilding when the second disk fails. The disk array also includes a redundancy management table to log disk locations of data stored in the first disk and copied to the auxiliary disk, and a controller to control reading and writing of the data X between the buffer and two redundant disks in response to a read or write request. The controller is configured to: (a) copy to the auxiliary disk, the data X stored in the buffer for rebuilding, in parallel with reading and writing the data X, when the second disk fails; (b) log, in the redundancy management table, copied disk locations of the data X copied in (a); and (c) return a 'read/write request complete' response to the host after completing the copying in (a).

Another aspect is a method for rebuilding a disk array having a mirror configuration. The disk array includes a buffer for temporarily storing data (data X) in a read or write request from a host (read/write request), a redundant first disk and second disk having a mirror configuration, an auxiliary disk used for rebuilding when the second disk fails, a redundancy management table for logging disk locations of data stored in the first disk and copied to the auxiliary disk, and a controller for controlling reading and writing of the data X between the buffer and two redundant disks in response to a read or write request. The method includes: (a) copying, to the auxiliary disk, the data X stored in the buffer for rebuilding, in parallel with reading and writing the data X, when the second disk fails; (b) logging, in a redundancy management table, copied disk locations of the data X copied in (a); and (c) returning a 'read/write request complete' response to the host after completing the copying in (a).

Yet another aspect includes a computer program product for rebuilding a disk array having a mirror configuration. The disk array includes a buffer for temporarily storing data (data X) in a read or write request from a host (read/write request), a redundant first disk and second disk having a mirror configuration, an auxiliary disk used for rebuilding when the second disk fails, a redundancy management table for logging disk locations of data stored in the first disk and copied to the auxiliary disk, and a controller for controlling reading and writing of the data X between the buffer and two redundant disks in response to a read or write request. The computer program product includes program code executable by the controller to perform: (a) copying, to the auxiliary disk, the data X stored in the buffer for rebuilding, in parallel with reading and writing the data X, when the second disk fails; (b) logging, in the redundancy management table, copied disk locations of the data X copied in (a); and (c) returning a 'read/write request complete' response to the host after completing the copying in (a).

BRIEF DESCRIPTION OF THE SEVERAL VIEWS OF THE DRAWINGS

FIG. 2 shows an example of a redundancy management table.

DETAILED DESCRIPTION

Figure 1:
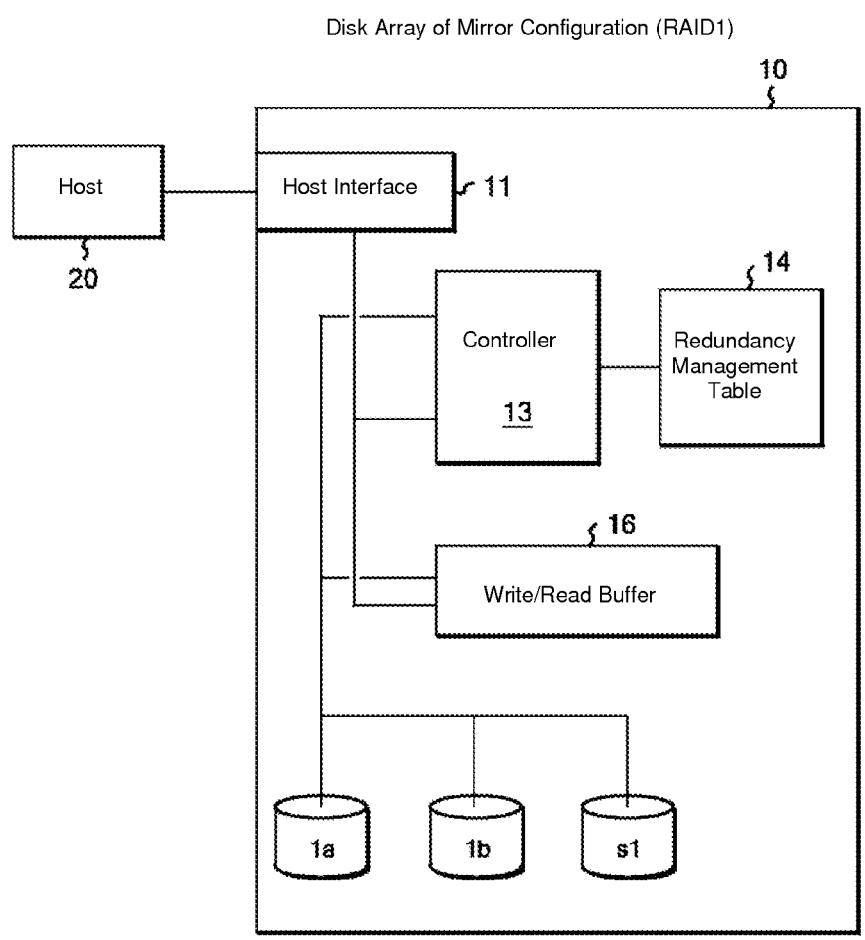
FIG. 1 shows a configuration of a disk array (RAID1) 10 with a mirror configuration in accordance with an exemplary embodiment.

Exemplary embodiments conduct a rebuilding process simultaneously and in parallel with frequent IO access operations from a host. A method used to rebuild disks with a mirror configuration can reliably be continued during host IO access operations if data integrity is to be ensured when a disk failure occurs.

Exemplary embodiments provide a method and disk array having a mirror configuration and a redundancy mechanism in which rebuilding can be performed in parallel with IO access from a host.

An exemplary embodiment includes a disk array having a mirror mechanism which is rebuilt when a disk failure occurs. The disk array has a mirror configuration including: a buffer for temporarily storing data (data X) in a read or write request from a host (read/write request); a first disk and second disk having mirror configurations which are redundant with respect to each other; an auxiliary disk used for rebuilding when the second disk fails; a redundancy management table for logging the disk locations of data stored in the first disk during normal operations and copied to the auxiliary disk; and a controller for controlling the reading and writing of data X between the buffer and two redundant disks in response to a read or write request. Here, the controller is configured to: (a) copy to the auxiliary disk, data X stored in the buffer for rebuilding, in parallel with reading and writing data X, when the second disk fails; (b) log, in the redundancy management table, the copied disk locations of the data X copied in (a); and (c) return a 'read/write request complete' response to the host after completing the copying in (a).

When the size of the current data X in the read/write request is smaller than a first predetermined value (for example, 4 MB or 6 MB), the controller in (a), in executing the rebuilding, reads data at the disk location contiguous with data X stored in the buffer, stores the data in the buffer, and copies the contiguous data stored in the buffer to the auxiliary disk as additional data so the overall size of the data reaches a second predetermined value (for example, 4 MB or 6 MB); and the controller in (b) logs the additional data in the redundancy management table.

When the size of the current data X in the read/write request is equal to or greater than a predetermined threshold value (for example 2 MB), the controller in (a), in executing the rebuilding, considers a subsequent read/write request from the host to be sequential, reads the data at the disk location contiguous with data X stored in the buffer (subsequent data Y) from a first disk, stores the data in the buffer, and copies the contiguous data stored in the buffer to the auxiliary disk as additional data so the overall size of the data reaches a second predetermined value (for example, 4 MB or 6 MB).

When the size of the current data X in the read/write request is less than a predetermined threshold value (for example, 2 MB), the controller in (a), in executing the rebuilding, considers a subsequent read/write request from the host to be random, reads the data at the disk location subsequent to and contiguous with data X stored in the buffer (subsequent data Y) and the data at the disk location prior to and contiguous with data X stored in the buffer (previous data Z) from the first disk, stores the data in the buffer, and copies the contiguous data X, data Y and data Z stored in the buffer to the auxiliary disk as additional data so the overall size of the data reaches a second predetermined value (for example, 4 MB or 6 MB).

The controller in the disk array of an exemplary embodiment is also configured to (d) reference the redundancy management table before the copying in (a) to determine whether data X stored in the buffer has been copied; and (e) bypass the copying in (a) and return to the host a 'read or write request complete' response when the current data X has been copied in (d).

The controller in the disk array of an exemplary embodiment also is configured to bypass copying to the auxiliary disk in (a) each predetermined number of times there is read/write request data from the host to reduce the delay in request completion responses to the host.

In addition, an exemplary embodiment is a method for rebuilding a disk array having a mirror configuration. This method comprises: a buffer for temporarily storing data (data X) in a read or write request from a host (read/write request); a first disk and second disk having mirror configurations and which are redundant with respect to each other; an auxiliary disk used for rebuilding when the second disk fails; and a controller for controlling the reading and writing of data X between the buffer and two redundant disks in response to a read or write request. Here, the disk array further comprises a redundancy management table for logging the disk locations of data stored in the first disk during normal operations and copied to the auxiliary disk. The method itself comprises the steps of: (a) copying, to the auxiliary disk, data X stored in the buffer for rebuilding, in parallel with reading and writing data X, when the second disk fails; (b) logging, in the redundancy management table, the copied disk locations of the data X copied in (a); and (c) returning a 'read/write request complete' response to the host after completing the copying in (a).

Furthermore, an exemplary embodiment is a computer program product for rebuilding a disk array having a mirror configuration. The disk array comprises: a buffer for temporarily storing data (data X) in a read or write request from a host (read/write request), a redundant first disk and second disk having a mirror configuration; an auxiliary disk used for rebuilding when the second disk fails; and a controller for controlling the reading and writing of data X between the buffer and two redundant disks in response to a read or write request. The disk array further comprises: a redundancy management table for logging the disk locations of data stored in the first disk during normal operations and copied to the auxiliary disk. The computer program product itself is embodied in a non-transitory medium including program code that is executable in the controller to perform the steps of: (a) copying, to the auxiliary disk, data X stored in the buffer for rebuilding, in parallel with reading and writing data X, when the second disk fails; (b) logging, in the redundancy management table, the copied disk locations of the data X copied in (a); and (c) returning a 'read/write request complete' response to the host after completing the copying in (a).

A disk array in an exemplary embodiment is able to reduce rebuilding times, even when the disk utilization rate in host IO operations is high.

The following is an explanation of an embodiment (example) in which data is written from a host to a disk array and read from the disk array to the host (host IO). The following embodiment is merely an example and is by no means restricted to the various reference values used to illustrate the size of read/write data (the first predetermined value, the second predetermined value, the predetermined threshold value, etc.).

RAID 1 in an exemplary embodiment comprises two disks with a mirror configuration and a single spare disk. When a failure occurs in one of the redundant disks in RAID1, the overall rebuilding time is reduced by efficiently copying the data on the disk in parallel with IO operations from the host. The rebuilding process is efficient because the data sizes and data positions to be copied are dynamically changed based on the access pattern of the host IO operations.

FIG. 1 shows the configuration of a disk array (RAID1) 10 with a mirror configuration to which an exemplary embodiment is applied. The disk array of an exemplary embodiment is also applied to RAID10 which includes RAID1 as a constituent element. The following is an explanation, with reference to the drawing, of the host IO operations performed on RAID1 in an exemplary embodiment. The disk array 10 has a controller 13, disks 1a, 1b having a mirror configuration, an auxiliary disk s1, a host interface unit 11, a read/write buffer 16, and a redundancy management table 14. The host interface 14 is a communication means of the host 20 and is a higher-level device in the disk array device 10.

The two disks 1a, 1b hold the same data and are redundant. That is, they have a mirror relationship to each other. Because they are redundant, user data remains secure when one of the two disks 1a, 1b fails as long as the other disk is operating normally. When a failure occurs in one of the disks 1b, the data in disk 1a is copied to (rebuilt in) the auxiliary disk s1 so that disk 1a establishes a mirror relationship with the auxiliary disk instead of with disk 1b. The spare disk s1 is separated from the disk array logically when disk 1a and disk 1b are operating normally. However, if one of the disks 1a, 1b fails, the spare disk s1 becomes a constituent element of RAID1.

The rebuilding of data on disk 1a in the auxiliary disk is treated separately in a logical manner depending on whether there is a host IO operation. The rebuilding of the auxiliary disk is performed in parallel with a host IO operation by copying data X in the host IO operation to the auxiliary disk at the same time as the IO process. A read/write buffer 16 is used in the transfer of data for IO access from the host. The buffer 16 may be DRAM or a solid state disk (SSD). During an IO operation from the host, data X stored in the buffer 16 is used as data for the auxiliary disk. In an exemplary embodiment, the size of the data X in the host IO operation is expanded in the buffer 16 and copied (as a portion of the rebuilding process). When there is a break in host IO operations, data from the remaining address locations on the disk 1a which have not been copied are copied via buffer 16 to complete the rebuilding.

The controller 13 is a function means used to control the operations of the various components of the disk array 10. The controller 10 includes a CPU and firmware. The controller 13 connects the buffer 16 to the host 20 via a host interface 11. Communication between the host 20 and the host interface 11 is performed using a small computer system interface (SCSI), Fibre Channel or the Ethernet. The controller 13 includes functions for the redundancy management table 14, read/write data requests, failure detection, and internal copying.

The disk array 10 accepts read and write requests from the host 20 using SCSI commands. The read or write data X is stored in the buffer 16 in, for example, fixed-length units. For example, read and write operations are performed in 2 MB units. In this example, 2 MB is used. The read/write data X is of variable length. Locations (addresses) on the disk are indicated using logical block addresses (LBA). One LBA indicates a sector, with a size that can be, for example, 512 B. An LBA indicates a logical address in the storage array 10 of RAID1. These LBAs, which indicate a single logic address, are physical addresses assigned within the disk array to one of two disks, disk 1a or disk 1b. Host IO operations are performed using data units in a plurality of address ranges (LBA blocks). For example, a single LBA block is performed using 1,000 LBA units (2 MB).

The data stored in the buffer 16 during a writing operation is sent in sequential order to disk 1a and disk 1b, and recorded at the same disk addresses, that is, at the same logical block addresses (LBAs). During a reading operation, either disk 1a or disk 1b is selected, the data is read from the indicated storage locations or LBAs, and the read data is stored in the buffer 14 and then sent to the host.

When a read command is received from the host 20, the controller 13 reads data X from either disk 1a or disk 1b and sends the data to the host 20 via the buffer 16. When the controller 13 receives a write command and data to be written from the host 20, data X is written to disk 1a and disk 1b via the buffer 16. At this time, the controller 13 'mirrors' the data on the first disk 1a and the second disk 1b. In order to create this redundancy, the same data is written at the same time to the same disk locations on the two disks, disk 1a and disk 1b.

In order to reconstruct a mirror relationship with the auxiliary disk when one of the disks 1b fails, the copied address ranges on the disks (the range of disk locations is referred to as "LBA blocks" and "address blocks" below) are logged in the redundancy management table 14. In one situation, disk 1b fails and redundancy with disk 1a is no longer maintained. In this situation, all of the LBA blocks in the normally operating disk 1a are copied to the auxiliary disk s1.

FIG. 2 shows an example of a redundancy management table. A redundancy management table is stored in a non-volatile storage area inside the disk array 10. The first item indicates LBA blocks (address blocks) which are the read and write units of the host. In the host IO operations performed in this example, the disk write units in the storage array 10 are each, for example, data (2 MB) in an LBA range of 1,000. The second item indicates the cumulative size of the sequential blocks in the predetermined block units of the LBA. The third item is a log indicating whether each block has been copied. During normal rebuilding, LBA blocks are copied sequentially from the lowest number to the highest number.

The controller 13 has functions for referencing, updating and resetting this table. When a failure has been detected in disk 1b, the controller 13 immediately references the redundancy management table and resets the "OK" copy flags. The controller 13 then logs the redundant "OK" flags when uncopied LBA blocks on the disk are copied to address blocks on the auxiliary disk which does not have a mirror configuration.

Figure 3:
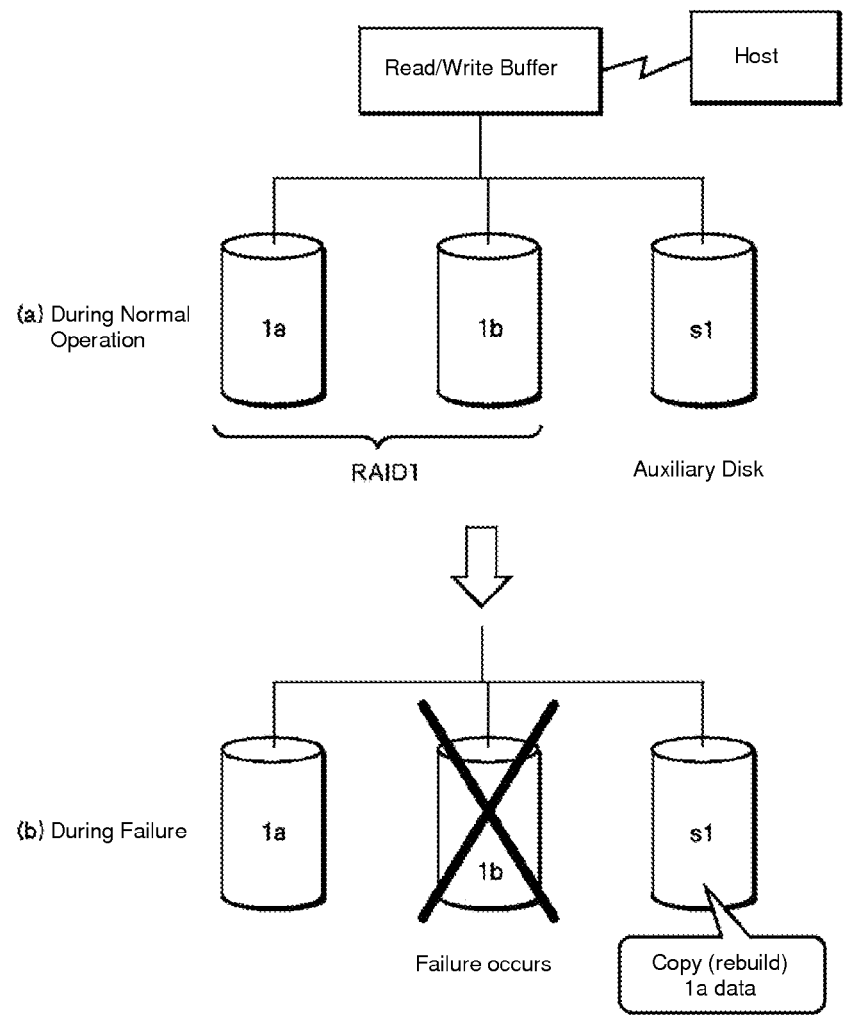
FIG. 3 shows an example of rebuilding an auxiliary disk to replace a disk 1b when disk 1b has failed.

FIG. 3 shows the rebuilding of an auxiliary disk to replace disk 1b when disk 1b has failed. The controller 13 reconstructs a disk array (RAID 1) in which disk 1a and auxiliary disk s1 have a mirror configuration.

Figure 4:
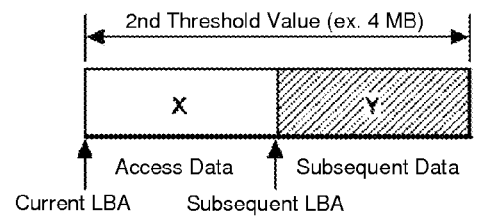
FIG. 4 shows an example of copying data X and additional data Y, Z in parallel with the processing of read/write data X for the host.
Figure 4:
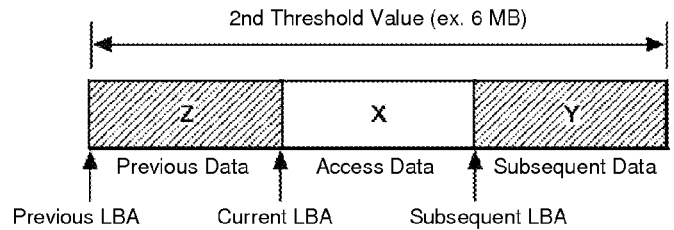

FIG. 4 shows the copying of data X and additional data Y, Z in parallel with the processing of read/write data X for the host. Data Y and data Z, which are contiguous with data X stored in the buffer 16, are added and the contiguous data is copied to the auxiliary disk s1 in parallel with the host IO processing. Operations, such as reading the added data to data X in the buffer 16, delays the completion response for host IO processing more than usual. An exemplary embodiment provides a method which is able to rebuild RAID1 while minimizing delays in reading and writing processing performed on the disk 1a. This is achieved by copying data whose size is greater than a fixed value to the auxiliary disk. For example, by adding data to data X, whose size is, for example, smaller than 4 MB, and then copying the data to the auxiliary disk, the number of copying operations can be reduced and the rebuilding process performed more efficiently. If, as mentioned in (a) and (b), the size of data X is less than 4 MB and the subsequent data Y and the previous data Z added as additional data brings the overall size up to 4 MB or 6 MB, a larger amount of data can be copied in a single copying operation. When the size of read/write data X is smaller than a first predetermined value (for example, 4 MB), data Y or Z is added and copied. When the size of data X is equal to or greater than the first predetermined value, it is large enough to be copied to the auxiliary disk s1 alone.

In (a), the redundancy operation includes additional data in the subsequent LBA when the size of written data is equal to or greater than a predetermined threshold value (for example, 2 MB). When data X is equal to or greater than the predetermined threshold value, a subsequent host IO operation is often for the sequential access of contiguous data. Therefore, the data in the subsequent LBA contiguous with data X (subsequent data Y) is added to the data. The process for copying data X and subsequent data Y delays the host IO response process somewhat compared to normal, but the rebuilding is more efficient when the size of the data to be copied is increased. When X is equal to or greater than the predetermined threshold value, the data Y in the subsequent LBA is added as additional data to raise the overall copy size to a second predetermined value (for example, 4 MB or 6 MB). If the subsequent data Y is additionally copied to the auxiliary disk in advance, data copying can be omitted in a subsequent access operation. Also, the amount of time required to rebuild a disk with a mirror configuration can be reduced when contiguous data the size of a first predetermined value or second predetermined value, which is greater than the size of data X in the host IO operation, is copied to the auxiliary disk. The size of the subsequent data Y can be adjusted to keep IO response delays from becoming too long. The second predetermined value may be identical to the first predetermined value.

In (b), data Z from the previous LBA (previous data Z) is added in addition to subsequent data Y when the size of the written data is smaller than a predetermined threshold value (for example, 2 MB). When the size of the read/write data X is smaller than the predetermined threshold value, a subsequent host IO operation is often for random access of data. Therefore, previous data Z is also added. Previous data Z is included in addition to subsequent data Y, and subsequent data Y and previous data Z are read from disk 1a to the buffer 16 so that the size of the contiguous data (X, Y, Z) reaches a second predetermined value (for example, 6 MB). If additional data Y, Z is copied to the auxiliary disk s1 in addition to data X in the host IO operation, the copying of data can be eliminated from a subsequent host IO access operation.

Figure 5:
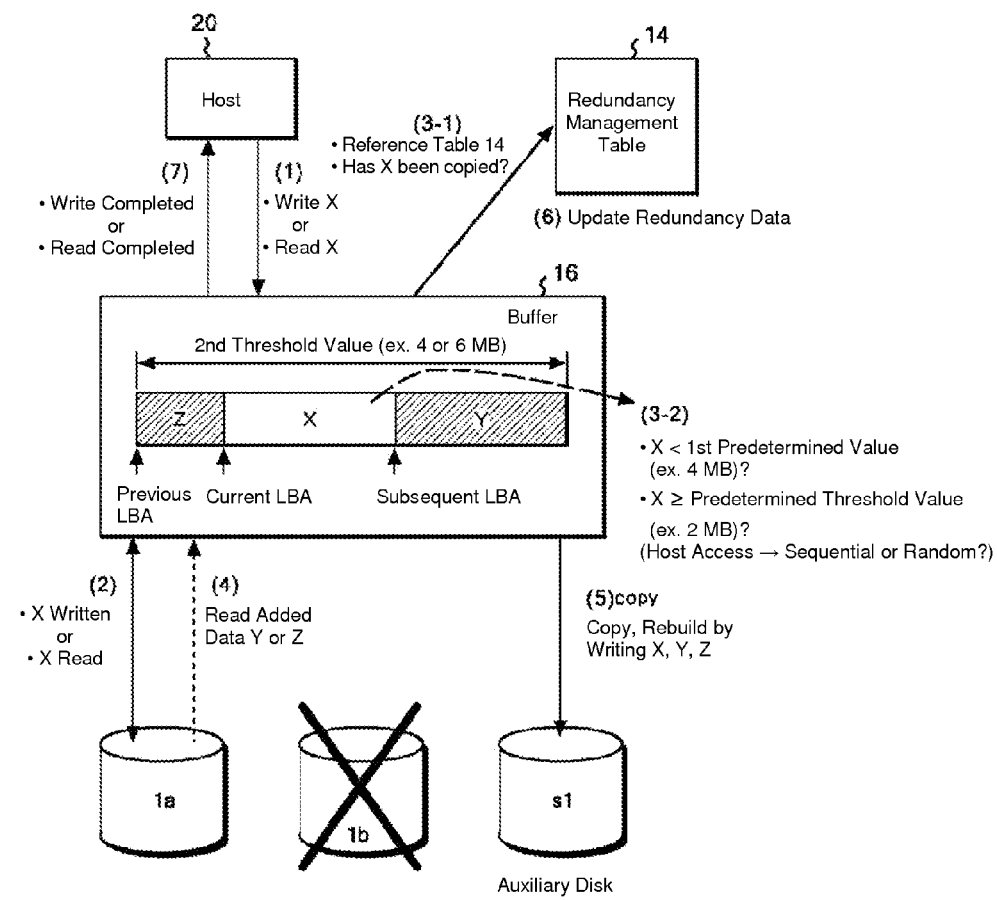
FIG. 5 shows an example of a relationship between processing steps and configuration elements when copying data from a disk which is operating normally in parallel with read/write access from a host.
Figure 6:
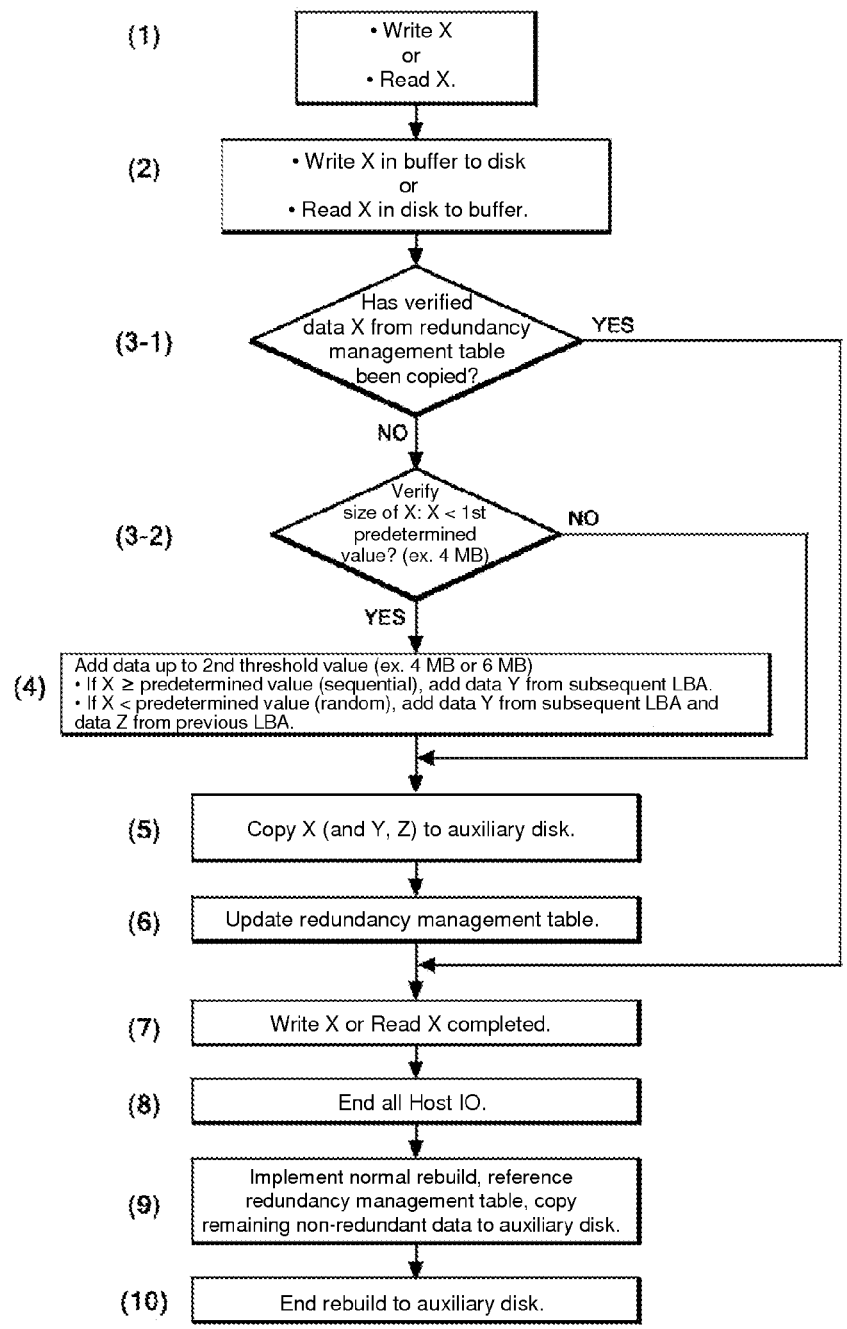
FIG. 6 shows an example processing flow for copying data X stored in a buffer and rebuilding a mirror configuration in parallel with host IO operations.

FIG. 5 shows the relationship between the processing steps and the configuration elements when copying data from a disk which is operating normally in parallel with host IO operations. FIG. 6 shows the processing flow for copying data X stored in a buffer and rebuilding a mirror configuration in parallel with host IO operations. Both processing flows are handled by the controller 13. Processing numbers (1) through (7) have the same content in FIG. 5 and FIG. 6.

(1): The disk array 10 accepts a read or write request for data X from the host.

(2): In a write request, data X stored in the buffer is written to disk 1a. In a read request, data X is read from disk 1a, stored in the buffer, and then sent to the host.

(3-1): Table 14 is referenced to determine whether data X stored in the buffer 16 has been copied to the auxiliary disk. When, for example, "OK" has been affixed to a single LBA block in FIG. 2, the data in the block has been copied to the auxiliary disk. When it has been copied, the copying of data X to the auxiliary disk is skipped, and a write process completion response is sent to the host (7). When data X has not been copied, it is performed in a subsequent copying process (3-2).

(3-2): In the copying process, subsequent data Y is added to data X when the size of data X is smaller than a first predetermined value (for example, 4 MB). If the size of data X is equal to or greater than the first predetermined value, the copying process is performed without adding data. The first predetermined value (for example, 4 MB) is set because the host IO process is delayed compared to the speed of the overall rebuilding process when small amounts of data are copied frequently.

(3-2) & (4): Subsequent data Y or previous data Z added from the disk 1a to the buffer 16 is ensured so the size of the data copied to the auxiliary disk is contiguous data that is the size of a second predetermined value (4 MB or greater). The second predetermined value may be identical to the first predetermined value. When the size of data X is equal to or greater than a predetermined threshold value, a subsequent host IO operation is considered to be sequential, and additional data Y is read from disk 1a to the buffer 16 (FIG. 4 (a)). When the size of data X is less than a predetermined threshold value, a subsequent host IO operation is considered to be random, and previous data Z is read in addition to subsequent data Y from disk 1a to the buffer 16 (FIG. 4 (b)). The predetermined threshold value can be changed depending on the access mode of the host IO operations because the value merely indicates the relationship between data size and access patterns (sequential and random). The size ratio between previous data Z and subsequent data Y can be changed depending on the expected pattern of subsequent host IO operations.

(5): When host IO operations are considered to be sequential (FIG. 4 (a)), the contiguous data X, Y stored in the buffer 16 is copied to the auxiliary disk. When host IO operations are considered to be random (FIG. 4 (b)), the contiguous data X, Y and Z stored in the buffer 16 is copied to the auxiliary disk (FIG. 4 (b)).

(6): When data X, Y and Z stored in the buffer 16 has been copied to the auxiliary disk, the corresponding LBA blocks are updated in the redundancy management table 14.

(7): A data read/write completion response is sent to the host.

(8): Data read/write operations from a plurality of hosts are completed (7), and all host IO operations ended.

(9): During the normal rebuilding process, after host IO operations have been completed, the table is referenced, and the data in the remaining LBA blocks is copied sequentially via the buffer 16.

(10): The rebuilding of the auxiliary disk ends when all data on disk 1a has been copied.

Subsequent data Y and previous data Z is sequentially continuous data with respect to data X in the host IO operation. The reading of added data Y and data Z from the buffer 16 is an extra operation which delays the response compared to the normal reading and writing of data X. However, if the size of continuous data X, Y, Z copied to the auxiliary disk s1 is larger, the rebuilding process can be performed more quickly. Also, partial rebuilding performed during idle period after host IO processing has been completed extends the rebuilding process over a longer period in system environments with frequent host IO operations. Because the storage array is not maintaining a mirror configuration during this period, the possibility of complete data loss due to an unexpected failure increases. Therefore, the disk array of an exemplary embodiment ensures an earlier rebuild in parallel with host IO processing.

In an exemplary embodiment, a rebuild process with a mirror configuration is implemented while minimizing delays in host IO responsiveness. In this way, host IO timeouts can be avoided. In addition, the additional data processing size can be adjusted to control response times. This allows the effects of intense host access and batch processing times to be taken into account. A mirror recovery operation, that is, a rebuilding operation, is performed N times for every M host IO access operations. However, N can be set to zero. This allows the operator to give priority to the completion of the currently running batch processing (host IO processing). More specifically, host IO operations or rebuilding operations can be given priority by avoiding additional data once every three host IO operations.

In the example described above, the rebuilding process was performed on a RAID 1. Shorter rebuilding times can be expected, even when there is a high disk utilization rate by host IO operations. The present invention was explained with reference to exemplary embodiments, but the scope is by no means limited by these examples. It should be apparent to those skilled in the art that various embodiments can be adopted and modified without departing from the spirit and scope of this disclosure.

What is claimed is:

1. A disk array having a mirror configuration to rebuild, the disk array comprising:
   a buffer to temporarily store data (data X) in a read or write request from a host (read/write request);
   a redundant first disk and second disk having a mirror configuration;
   an auxiliary disk used to perform rebuilding when the second disk fails;
   a redundancy management table to log disk locations of data stored in the first disk and copied to the auxiliary disk; and
   a controller to control reading and writing of the data X between the buffer and two redundant disks in response to a read or write request, the controller configured to:
   (a) copy to the auxiliary disk, the data X stored in the buffer for rebuilding, in parallel with reading and writing the data X, when the second disk fails;
   (b) log, in the redundancy management table, copied disk locations of the data X copied in (a); and
   (c) return a 'read/write request complete' response to the host after completing the copying in (a), wherein the controller in (a), when a size of a current data X in the read/write request is smaller than a first predetermined value, in executing the rebuilding, reads data at a disk location contiguous with the data X stored in the buffer from a first disk, stores the data in the buffer, and copies the contiguous data stored in the buffer to the auxiliary disk as additional data such that an overall size of the data reaches a second predetermined value; and the controller in (b) logs the additional data in the redundancy management table.

2. The disk array according to claim 1, wherein the controller in (a), when the size of the current data X in the read/write request is equal to or greater than a predetermined threshold value, in executing the rebuilding, considers a subsequent read/write request from the host to be sequential, reads the data at the disk location contiguous with the data X stored in the buffer (subsequent data Y) from the first disk, stores the data in the buffer, and copies the contiguous data stored in the buffer to the auxiliary disk as additional data such that the overall size of the data reaches a second predetermined value.

3. The disk array according to claim 1, wherein the controller in (a), when the size of the current data X in the read/write request is less than a predetermined threshold value, in executing the rebuilding, considers a subsequent read/write request from the host to be random, reads the data at a disk location subsequent to and contiguous with data X stored in the buffer (subsequent data Y) and the data at a disk location prior to and contiguous with the data X stored in the buffer (previous data Z) from the first disk, stores the data in the buffer, and copies the contiguous data stored in the buffer to the auxiliary disk as additional data such that the overall size of the data reaches a second predetermined value.

4. The disk array according to claim 1, wherein the controller is further configured to:
   (d) reference the redundancy management table before the copying in (a) to determine whether the data X stored in the buffer has been copied; and
   (e) bypass the copying in (a) and return to the host a 'read or write request complete' response when the current data X has been copied in (d).

5. The disk array according to claim 1, wherein the controller is further configured to bypass copying to the auxiliary disk in (a) each predetermined number of times there is read/write request data from the host to reduce the delay in request completion responses to the host.

6. A method for rebuilding a disk array having a mirror configuration comprising a buffer for temporarily storing data (data X) in a read or write request from a host (read/write request), a redundant first disk and second disk having a mirror configuration, an auxiliary disk used for rebuilding when the second disk fails, a redundancy management table for logging disk locations of data stored in the first disk and copied to the auxiliary disk, and a controller for controlling reading and writing of the data X between the buffer and two redundant disks in response to a read or write request, the method comprising:
   (a) copying, to the auxiliary disk, the data X stored in the buffer for rebuilding, in parallel with reading and writing the data X, when the second disk fails;
   (b) logging, in a redundancy management table, copied disk locations of the data X copied in (a); and
   (c) returning a 'read/write request complete' response to the host after completing the copying in (a), wherein the controller in (a), when a size of a current data X in the read/write request is smaller than a first predetermined value, in executing the rebuilding, reads data at a disk location contiguous with the data X stored in the buffer from a first disk, stores the data in the buffer, and copies the contiguous data stored in the buffer to the auxiliary disk as additional data such that an overall size of the data reaches a second predetermined value; and the controller in (b) logs the additional data in the redundancy management table.

7. The method according to claim 6, wherein the controller in (a), when the size of the current data X in the read/write request is equal to or greater than a predetermined threshold value, in executing the rebuilding, considers a subsequent read/write request from the host to be sequential, reads the data at the disk location contiguous with the data X stored in the buffer (subsequent data Y) from the first disk, stores the data in the buffer, and copies the contiguous data stored in the buffer to the auxiliary disk as additional data such that the overall size of the data reaches a second predetermined value.

8. The method according to claim 6, wherein the controller in (a), when the size of the current data X in the read/write request is less than a predetermined threshold value, in executing the rebuilding, considers a subsequent read/write request from the host to be random, reads the data at a disk location subsequent to and contiguous with data X stored in the buffer (subsequent data Y) and the data at a disk location prior to and contiguous with the data X stored in the buffer (previous data Z) from the first disk, stores the data in the buffer, and copies the contiguous data stored in the buffer to the auxiliary disk as additional data such that the overall size of the data reaches a second predetermined value.

9. The method according to claim 6, further comprising:
   (d) referencing the redundancy management table before the copying in (a) to determine whether the data X stored in the buffer has been copied; and
   (e) bypassing the copying in (a) and returning to the host a 'read or write request complete' response when the current data X has been copied in (d).

10. The method according to claim 6, further comprising:
bypassing copying to the auxiliary disk in (a) each predetermined number of times there is read/write request data from the host to reduce the delay in request completion responses to the host.

11. A computer program product for rebuilding a disk array having a mirror configuration comprising a buffer for temporarily storing data (data X) in a read or write request from a host (read/write request), a redundant first disk and second disk having a mirror configuration, an auxiliary disk used for rebuilding when the second disk fails, a redundancy management table for logging disk locations of data stored in the first disk and copied to the auxiliary disk, and a controller for controlling reading and writing of the data X between the buffer and two redundant disks in response to a read or write request, the computer program product comprising a non-transitory storage medium comprising program code executable by the controller to perform:
 (a) copying, to the auxiliary disk, the data X stored in the buffer for rebuilding, in parallel with reading and writing the data X, when the second disk fails;
 (b) logging, in the redundancy management table, copied disk locations of the data X copied in (a); and
 (c) returning a 'read/write request complete' response to the host after completing the copying in (a), wherein the controller in (a), when a size of a current data X in the read/write request is smaller than a first predetermined value, in executing the rebuilding, reads data at a disk location contiguous with the data X stored in the buffer from a first disk, stores the data in the buffer, and copies the contiguous data stored in the buffer to the auxiliary disk as additional data such that an overall size of the data reaches a second predetermined value; and the controller in (b) logs the additional data in the redundancy management table.

12. The computer program product according to claim 11, wherein the controller in (a), when the size of the current data X in the read/write request is equal to or greater than a predetermined threshold value, in executing the rebuilding, considers a subsequent read/write request from the host to be sequential, reads the data at the disk location contiguous with the data X stored in the buffer (subsequent data Y) from the first disk, stores the data in the buffer, and copies the contiguous data stored in the buffer to the auxiliary disk as additional data such that the overall size of the data reaches a second predetermined value.

13. The computer program product according to claim 11, wherein the controller in (a), when the size of the current data X in the read/write request is less than a predetermined threshold value, in executing the rebuilding, considers a subsequent read/write request from the host to be random, reads the data at a disk location subsequent to and contiguous with data X stored in the buffer (subsequent data Y) and the data at a disk location prior to and contiguous with the data X stored in the buffer (previous data Z) from the first disk, stores the data in the buffer, and copies the contiguous data stored in the buffer to the auxiliary disk as additional data such that the overall size of the data reaches a second predetermined value.

14. The computer program product according to claim 11, wherein the program code executable by the controller is further configured to perform:
 (d) referencing the redundancy management table before the copying in (a) to determine whether the data X stored in the buffer has been copied; and
 (e) bypassing the copying in (a) and returning to the host a 'read or write request complete' response when the current data X has been copied in (d).

15. The computer program product according to claim 11, wherein the program code executable by the controller is further configured to bypass copying to the auxiliary disk in (a) each predetermined number of times there is read/write request data from the host to reduce the delay in request completion responses to the host.

* * * * *